March 15, 1966 M. H. FARBER ET AL 3,240,147
BROILER AND ROTISSERIE COMBINATION
Filed June 17, 1963 3 Sheets-Sheet 3

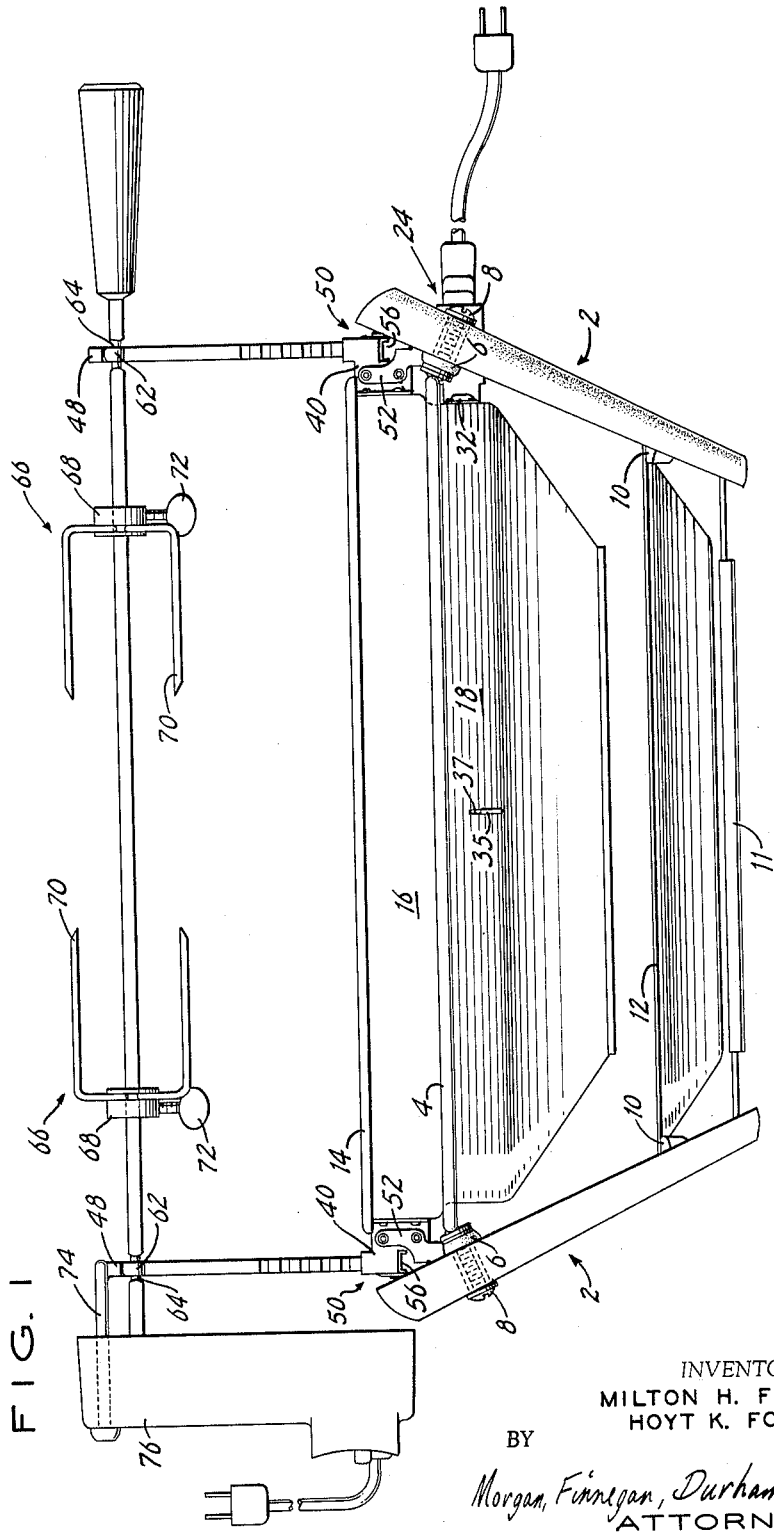
INVENTORS
MILTON H. FARBER
HOYT K. FOSTER
BY Morgan, Finnegan, Durham & Pine
ATTORNEYS

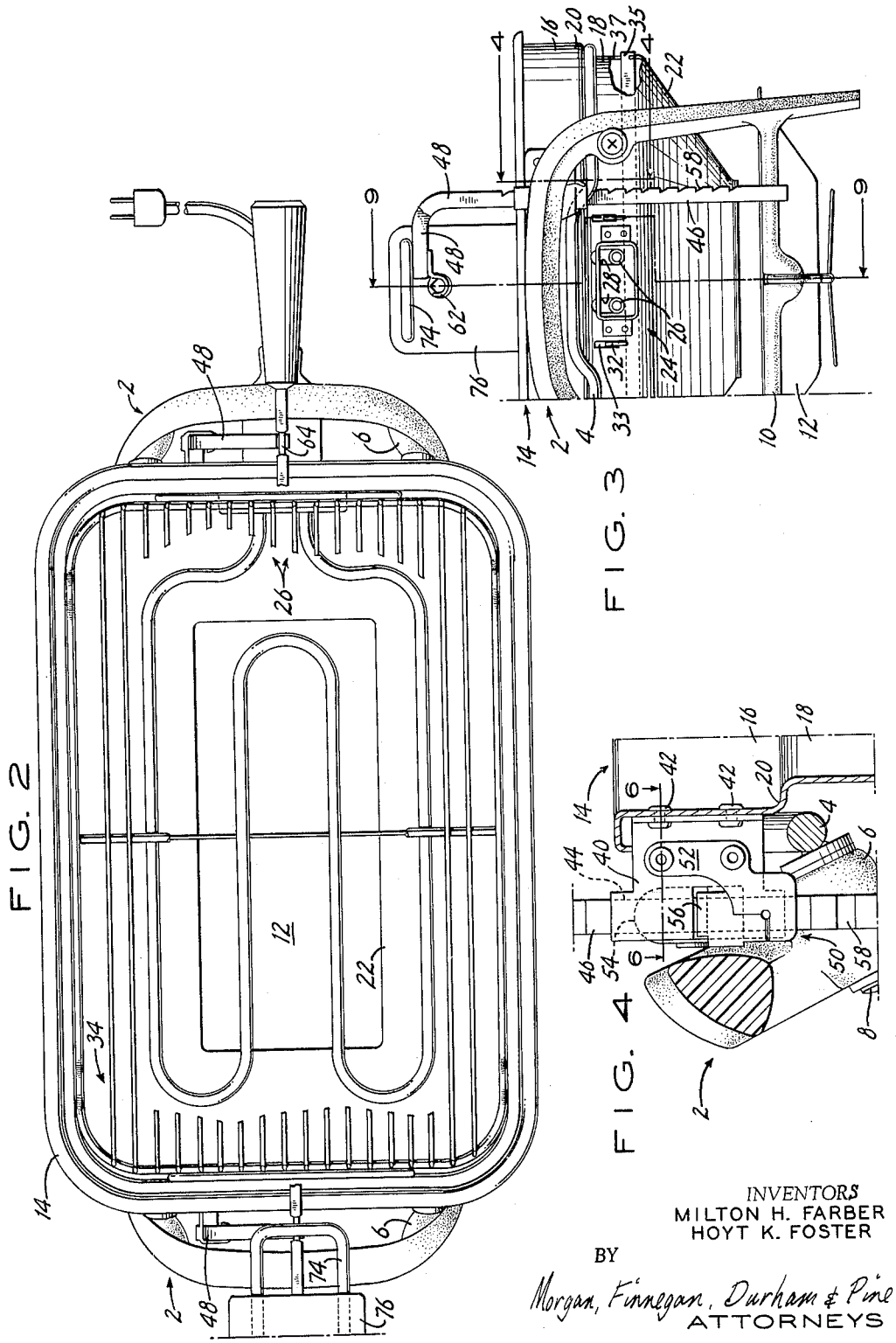

INVENTORS
MILTON H. FARBER
HOYT K. FOSTER
BY
Morgan, Finnegan, Durham & Pine
ATTORNEYS

United States Patent Office 3,240,147
Patented Mar. 15, 1966

3,240,147
BROILER AND ROTISSERIE COMBINATION
Milton H. Farber, New Rochelle, and Hoyt K. Foster, Hollis, N.Y., assignors to S. W. Farber, Inc., New York, N.Y., a corporation of New York
Filed June 17, 1963, Ser. No. 288,124
10 Claims. (Cl. 99—421)

This invention relates to a new and improved cooking device. More particularly, the present invention relates to a new and improved cooking device in the form of a broiler or combination broiler and rotisserie which is smokeless and spatterproof.

There have been in the past and are presently on the market a large number of broiler and broiler-rotisserie combination units. Although these devices have been generally satisfactory for cooking meats, poultry and the like, they have suffered from certain defects and disadvantages which have substantially eliminated or retarded the use of such devices indoors.

Prior art devices have been generally unsatisfactory for use indoors because they have emitted smoke and have spattered fats and greases thereby defacing walls and ceilings. One factor which has contributed to the smoking and spattering of prior art devices has been the failure of such devices to maintain the temperature of parts other than the heater unit below the carbonizing temperature of fat. Thus many prior art devices have included hoods, closed broiler units or enclosures around the entire unit to prevent smoking, but the result has been that the parts other than the heating unit have temperatures higher than the carbonizing temperature of fat. Such devices, therefore, have caused rather than eliminated smoking and spattering of fats and greases.

In accordance with the present invention a cooking device is provided which is smokeless and spatterproof. The present invention is in one form an electrical broiler and in another form an electrical rotisserie. The device, however, is constructed and arranged so that the assembly can be used as a broiler or a rotisserie.

In accordance with this invention the parts of the assembly are arranged with respect to one another so that the heating unit is spaced from or isolated from the other parts so that the parts other than the heating unit are maintained at a temperature below the carbonizing temperature of fat. It has been found that where the parts other than the heating unit are maintained at a temperature below the carbonizing temperature of fat the assembly will not smoke or spatter fats and greases. This result is achieved by the present invention by including a broiler body that has an open ended construction without pockets or fat collecting edges and that includes a lower portion having the form of an inverted obelisk which guides the fat droplets into a drip pan having a temperature substantially below the temperature of the broiler body. A heating unit is located within the broiler body in spaced relation to at least three sides of the broiler body. The drip pan is located beneath and in spaced relation to the broiler body and the heating unit. Means in the form of a grill or a rotisseries is mounted above and in spaced relation to the heating unit for the purpose of supporting the item to be cooked, such as meat or fowl.

More particularly, the present invention utilizes a rod type electrical heating element which extends through one side of the broiler body, but is otherwise spaced from the walls of the broiler-body. The heating unit, when in use, is maintained at a temperature of between 1200° F. and 1700° F. and preferably at about 1400° F. It has been found that at this temperature the heating unit in combination with the novel broiler body herein provides sufficient heat to enable the device to serve as a broiler or a rotisserie and perform the normal function of such units. The heating unit at this temperature is "red hot" and fats or greases dripping onto the heating element slide off of it without splashing into the surrounding atmosphere.

There is a spacial relationship between the heating unit, the broiler body and the drip pan which permits air currents to move constantly upwardly thereby maintaining the temperature of the walls of the broiler body and the drip pan at a temperature below the carbonizing temperature of fat. These air currents maintain the broiler body and the drip pan at a temperature below the carbonizing temperature of most fats. Preferably, the broiler body is maintained at a temperature of not over 300° F.–375° F. and most preferably at a temperature of about 300° F. The drip pan is maintained at a temperature below the broiler body such that water and blood dripping therein will not sizzle. Thus the drip pan is maintained at a temperature less than 220° F.

By virtue of the invention herein, the fat drops dripping from the item being cooked slide down the walls of the broiler body and into the drip pan while in liquid form and the droplets do not splash, spatter or smoke.

Another advantage of the present invention is that the parts of the broiler-rotisserie unit are constructed and arranged for ease of assembly and disassembly thereby permitting simple and expeditious cleaning of the assembly.

Th invention consists in the novel parts, constructions, arrangements, combinations and improvements herein shown and described.

With the foregoing in mind it is an object of this invention to provide a new and improved cooking device.

Another object of this invention it to provide a new and improved broiler-rotisserie combination.

A further object of this invention is to provide a new and improved cooking device which is smokeless and spatterproof.

It is yet another object of this invention to provide a novel open end broiler assembly for use in a cooking device.

Another object of this invention is to provide a cooking device including a heating unit, a broiler body and a drip pan wherein all of the parts except the heating unit are maintained at a temperature belows the carbonizing temperature óf fat and preferably below 375° F.

A still further object of this invention is to provide a new and improved cooking device including a broiler body, a heating unit and a drip pan wherein such parts are constructed and arranged in spacial relationship whereby the broiler body and drip pan are maintained at a temperature below the carbonizing temperature of fat and wherein the drip pan is maintained at a temperature below the sizzling temperatures of water and blood.

A further object of this invention is to provide a new and improved cooking device including a broiler body, a heating unit and a drip pan wherein these parts are constructed and arranged so that the broiler body and drip pan are maintained below predetermined temperatures by air currents passing over the drip pan and by the sides of the broiler body.

More specifically, an object of this invention is to provide a cooking device including a heating unit, a broiler body and drip pan wherein the heating unit is run at a temperature of 1200° F. to 1700° F. and the broiler body is maintained at a temperature of not over about 300° F.–375° F. and wherein the drip pan is maintained at a temperature below 220° F.

Another object of this invention is to provide a new and improved broiler rotisserie assembly which is readily assembled and disassembled for cleaning purposes.

Additional objects and advantages of the invention will be set forth in part hereinafter, and in part will be obvious herefrom or may be learned by practicing the invention, the same being realized and attained by means of the instrumentalities and combinations pointed out in the appended claims.

The accompanying drawings, referred to herein, and constituting a part hereof, illustrate one embodiment of the invention, and together with the description, serve to explain the principles of the invention.

Of the drawings:

FIGURE 1 is a side elevational view of a combination broiler-rotisserie assembly embodying the present invention.

FIGURE 2 is a top plan view of the device shown in FIGURE 1.

FIGURE 3 is a partial end view of the device shown in FIGURES 1 and 2.

FIGURE 4 is a sectional view taken along line 4—4 of FIGURE 3.

Figure 5:
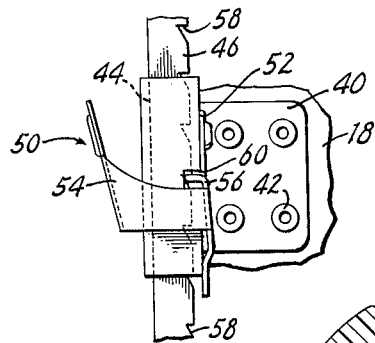
FIGURE 5 is a broken away elevation of the locking means employed in the rotisserie unit.
Figure 6:
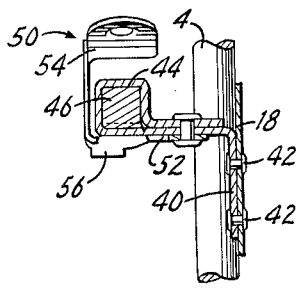
FIGURE 6 is a sectional view taken along line 6—6 of FIGURE 4.

Referring to the drawings, there is shown therein a pair of spaced apart leg supports 2. The leg supports are substantially U-shaped (see, e.g., FIG. 2) and are inclined towards one another at an angle of approximately 30° from the vertical.

In accordance with this invention means are provided for suspending a broiler body and heating element combination and a drip pan from the leg supports. As embodied herein, this means comprises a bar like support 4 having a substantially rectangular outline. The short side of the support has a pair of spaced bosses 6 extending therefrom. The bosses 6 are connected by means of screws 8 or other conventional connecting means to the leg supports to thereby fixedly connect the bar support 4 and the legs 2. The bar support 4 is adapted to support the broiler body and the heating unit combination.

In accordance with this invention means are provided for suspending a drip pan in spaced relation to the broiler body. As embodied herein, this means comprises inwardly directed flanges 10 extending between the legs of the U-shaped leg supports 2 at the lower end thereof. The drip pan 12 itself is dish shaped and includes upwardly and downwardly extending side walls. It will be noted that there is a space between the lowermost portion of the broiler body and the bottom of the drip pan. The drip pan can be made of any convenient material such as aluminum preferably spaced from the heating unit about four and five-eighths inches. A flat sheet piece of metal 11 is located beneath the drip pan (FIG. 1) to protect the surface on which the unit is located in the event the drip pan is not used.

The present invention includes a novel broiler body having unique characteristics when used in the combination described herein. In this connection it should be noted that for convenience of expression the term "broiler body" is used to connote the structure wherein the heating element is located regardless of whether the device as a whole is used as a broiler or a rotisserie.

Furthermore, although the broiler body of the present invention constitutes an integral body, preferably made of stainless steel, it will, for convenience of description, be described as if it included three sections. The broiler body, of course, can be made of any convenient material.

Figure 9:
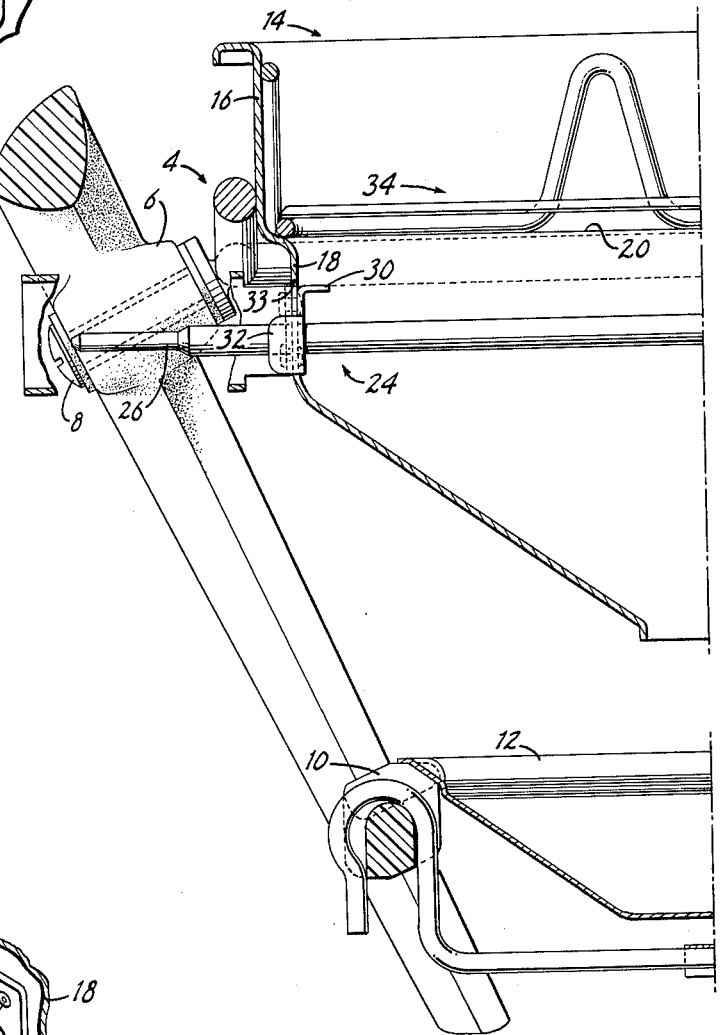
FIGURE 9 is a sectional view of FIGURE 1 taken along line 9—9 of FIG. 3.

The broiler body 14 of the present invention includes a first section 16 one end of which is substantially rectangular in form (see FIGS. 1, 2 and 9). A second section 18 which is substantially rectangular but smaller than the first section 16 is provided adjacent to and immediately below the first section 16. Intermediate and merging with the first and second sections of the broiler body is a surface 20 which is inclined downwardly and inwardly.

The third section 22 of the broiler body is in the form of an inverted hollow obelisk so that the sides thereof are inclined inwardly and downwardly. It will be apparent from the above construction that the broiler body is open at both ends and that the opening at the top of the device is substantially larger than the opening at the bottom. In one embodiment of the invention the opening at the top of the broiler is about 10½ inches by 15½ inches whereas the bottom opening is about 4½ inches by 9¾ inches.

Located within the broiler body and preferably within the second section 18 is a heating unit 24. The heating unit is a rod or bar type of heater which has a pair of terminals 26 at one end. The terminals 26 extend through a pair of elongated apertures 28 in one end wall of the second section of the broiler body. A bracket 30 (see FIGS. 3 and 9) having tags 32 at its outer end extend through slots 33 in the frame to aid in supporting the heating unit which, as can be seen in FIGURE 2, is planar and has the general outline of a fork. Intermediate the ends of the heating unit a bar 35 is mounted in slots 37 in the long sides of the broiler body on which the heating unit rests to support the same. The heating unit, it will be noted, is mounted so that it is spaced from the sides of the broiler body. Preferably, the heating unit is spaced approximately 1½ inches from the walls of the broiler body with the exception, of course, of the wall through which the heating unit extends.

A grill unit 34 is provided and it rests on the inner surface of the inclined surface 20 thereby supporting the meat or fowl to be cooked.

The grill unit, of course, spaces the item being cooked, such as meat or fowl, from the heating unit. The distance of the supporting surface of the grill from the heating unit is adjustable and the grill is provided with legs 31 which can be engaged with the inner surface of the inclined supporting surface. Alternatively, the main surface of the grill can be supported on the supporting surface 20 in which case the legs 31 of the grill extend upwardly along the sides of the broiler body.

The inclined supporting surface 20 intermediate the first and second section of the broiler body rests upon the bar support 4 to thereby suspend the broiler body from the leg means. The surface 20 is inclined so that the broiler body will not have any ledges or pockets which collect fats.

Figure 8:
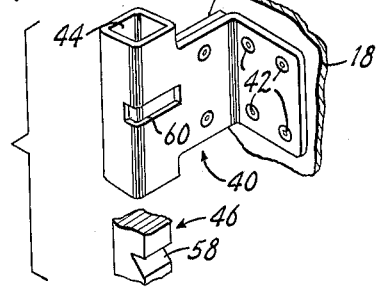
FIGURE 8 is a partial perspective view of the vertical bracket used in the rotisserie unit.

The device of the present invention is a combination device, in that it is adapted for use as a broiler or a rotisserie. When the device is used as a rotisserie, means are provided for mounting a spit in spaced relation to the heating unit. In this case, of course, the grill is not required. As embodied, a vertical bracket 40 (see FIG. 8) is attached by means of rivets 42 to the broiler unit. The vertical bracket includes a channel 44 into which the ratchet 46 of the spit supporting arm 48 extends.

Figure 7:
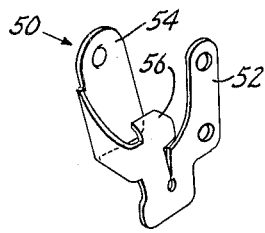
FIGURE 7 is a perspective view of a spring latch used in locking device for the rotisserie unit.

Means are provided for adjustably mounting a spit in a desired spaced relation with respect to the heating unit. This means including the spring latch 50 (see FIG. 7) having arm 52 attached to the bracket 40. The spring latch 50 is flexible with respect to arm 52 and includes latch 56 normally biased into engagement with one of the notches 58 in the ratchet 46. For this purpose there is a slot 60 in the channel 44 through which latch 56 extends. Opposite from the latch 56 is a finger flange 54 adapted to move the latch 56 out of engagement with the notches 58 in the arm 48. The latch is released by merely applying pressure to the finger flange 54. It will be understood that the ratchet arrangement for both spit supporting arms is identical, and for this reason only one has been described.

The spit supporting arms 48 terminate in semi-circular spit receiving members 62. The spit includes reduced diameter portions 64 which engage the spit receiving members and to thereby permit rotation thereof. A meat holder assembly 66 is mounted on the spit and comprises a boss member 68 having a plurality of tines 70 extending therefrom. A thumb screw 72 is for the purpose of permitting the meat holder to be adjustably located on the spit.

The spit 63 has a motor assembly 76 suspended from one end thereof. The spit extends into a socket of the motor assembly where it engages means, not shown, for rotating the spit. The construction of the motor assembly forms no part of the present invention and can be purchased on the open market. A U-shaped motor support 74 is provided which prevents the motor assembly from rotating. The support 74 thus merely prevents the motor from rotating while the spit actually supports the motor.

The basic operation of the device of the present invention is in large measure apparent from the foregoing description. However, the novel arrangement of the present invention leads to new and obvious results.

The heating unit of the present invention is adapted to run at a temperature of between 1200° F. and 1700° F. and preferably at about 1400° F. At this temperature the heating unit is red hot and fats and greases which fall onto the heating unit merely slide off of it onto the broiler body or into the drip pan.

As noted before, both ends of the broiler body are open. Thus there is a continually rising mass of air moving inwardly across the drip pan and upwardly through the broiler body (see FIG. 9). There is, of course, no enclosure on the top of the broiler. As a result the drip pan and the broiler body are continually cooled and the relationship of parts is such that the sides of the broiler body are maintained at a temperature, when the device is in operation, of not over 300°–375° F. and preferably at about 300° F. The temperature at which most fats carbonize is 375° F. so that a temperature below 375° F. is desired. The drip pan being spaced further from the heating unit than the broiler body is maintained at a temperature below that which water and blood dripping therein will sizzle thereby causing spattering and smoking. Preferably, therefore, the drip pan is maintained at a temperature below 220° F. At the same time, however, the inclined side walls of the obelisk part of broiler body reflect a sufficient amount of heat upwardly to insure that there is sufficient heat for cooking the foodstuff involved.

It is to be understood that the invention in its broader aspects is not limited to the specific elements, constructions, arrangements and improvements shown and described but also includes within the scope of the accompanying claims any departures therefrom which do not sacrifice the chief advantages thereof. For example, the broiler body need not be of a rectangular shape but may have other shapes, although the present preferred embodiment is shown in the drawings.

What is claimed is:

1. A smokeless and spatterless broiler cooking device comprising a pair of spaced leg means, a first support extending between said leg means, a broiler body having a top section which is substantially rectangular, a second intermediate section which is substantially rectangular and smaller than the top section and a third section having the shape of an inverted, hollow obelisk, a downwardly inclined surface between said top and intermediate sections of said broiler, said supporting means engaging said inclined surface to support said broiler, a heating unit mounted in said intermediate section of said broiler, a grill mounted on said inclined surface, a drip pan, means co-operating with said legs for mounting said drip pan below and in spaced relation to said broiler.

2. A smokeless and spatterproof cooking device comprising a pair of spaced leg supports, a rod like support having a substantially rectangular outline removably attached to said leg means adjacent one end thereof, an open ended broiler body having three sections, the first section having a substantially rectangular shape, a second section having a substantially rectangular shape which is smaller than said first section, a downwardly, inwardly inclined surface intermediate said first and second sections, said rod like supporting element engaging said inclined surface to thereby suspend said broiler body from said legs, a rod-like planar heating unit mounted in said second section, means for supporting meat in spaced relation to said heating unit, a drip pan, means co-operating with said legs for supporting said drip pan in spaced relation to said broiler unit whereby the temperature of the broiler unit and drip pan are maintained below the carbonizing temperature of fat.

3. A device as defined by claim 2 wherein said meat supporting means comprises a grill supported by said inclined surface.

4. A device as defined by claim 2 wherein said meat supporting means comprises: a pair of upright brackets supported by said rod like support at each end of said broiler, a spit rotatably mounted on said bracket motor means for rotating said spit suspended from said spit, and means for preventing rotation of said motor means.

5. A smokeless and spatterproof cooking device comprising: a pair of spaced legs, a support rod mounted between said legs adjacent the upper end thereof, an open ended broiler body including a substantially rectangular first section, a substantially rectangular second section smaller than said first section and inverted hollow obelisk third section, an inclined supporting surface merging with said first and second sections, a heating unit mounted on one side of said second section and extending into said second section and being spaced from the walls of said broiler unit, said heating unit adapted to run at a temperature of between 1200° F. and 1700° F., a drip pan, means co-operating with said legs for mounting said drip pan below and in spaced relation to said broiler body, means for supporting food in spaced relation to said heating unit, the surfaces of said broiler body and said drip being maintained at a temperature below 375° F. whereby fat dripping from the cooking meat will not carbonize when coming into contact with the surfaces of said broiler unit and said drip pan.

6. A device as defined in claim 5 wherein the drip pan is maintained at a temperature below 220° F. and the sides of the broiler body are maintained at a temperature of not over 300–375° F.

7. A cooking device which is smokeless and spatterproof comprising: spaced leg means, support means extending between said leg means, a broiler which is open at the top and the bottom suspended from said support means, an electrical heating unit mounted within and adjacent the top end of said broiler, a drip pan supported between said leg means beneath and in spaced relation to said broiler, means for supporting the material to be cooked above and in spaced relation to said broiler, said device being constructed and arranged so that when said electrical heating unit running at a temperature of 1200 F. to 1700° F. a mass of air moves upwardly through the broiler causing a draft of relatively cool air to pass over said drip pan and past the sides of the broiler so that the broiler and the drip pan are maintained at temperatures below the carbonizing temperature of fat.

8. A device as defined in claim 7 wherein the cooling air maintains the broiler at a temperature of not over 300°–375° F.

9. A device as defined in claim 8, wherein the cooling air maintains the drip pan at a temperature of below 220° F.

10. A self air-cooled smokeless and spatterproof cooking device adapted for use indoors comprising: spaced leg means, support means extending between said leg means, a broiler open at the top and bottom supported by said support means between said space leg means, a planar electrical heating unit mounted within and adjacent the top end of said broiler, a drip pan supported between said leg means in a position beneath and in spaced relation to said broiler, said heating unit being adapted to run at a temperature of 1200° F. to 1700° F. thereby causing an upward draft of air so that relatively cool air from the surrounding atmosphere passes over the surface of the drip pan and upwardly along the sides of the broiler to maintain the broiler at a temperature lower than the carbonizing temperature of fat and the drip pan at a temperature substantially below that of the broiler.

References Cited by the Examiner

UNITED STATES PATENTS

| | | | |
|---|---|---|---|
| 1,093,245 | 4/1914 | Best | 99—446 |
| 1,642,071 | 9/1927 | Hosking | 99—446 |
| 1,934,125 | 11/1933 | Hurt | 99—446 |
| 2,006,385 | 7/1935 | Dikeman | 99—446 |
| 2,214,060 | 9/1940 | McCormick | 99—446 |
| 2,505,976 | 5/1950 | Leon | 99—421 |
| 2,847,932 | 8/1958 | More | 99—421 |
| 2,903,549 | 9/1959 | Joseph | 99—446 X |
| 3,163,103 | 12/1964 | Shoup | 99—340 X |
| 3,174,863 | 3/1965 | Shoup | 99—446 X |

FOREIGN PATENTS 587,220   1/1959   Italy.

WALTER A. SCHEEL, *Primary Examiner.*

S. P. FISHER, *Assistant Examiner.*